(12) United States Patent
Satyamoorthy et al.

(10) Patent No.: US 10,083,459 B2
(45) Date of Patent: Sep. 25, 2018

(54) METHODS AND APPARATUS TO GENERATE A MEDIA RANK

(71) Applicant: The Nielsen Company (US), LLC, Schaumburg, IL (US)

(72) Inventors: Subramaniam Satyamoorthy, Oldsmar, FL (US); Sean C. Breedlove, Schaumburg, IL (US); Robert J. Fischer, Schaumburg, IL (US); Leslie Wood, Schaumburg, IL (US); Perry J. Fisch, Schaumburg, IL (US); Carleton W. Spaulding, Schaumburg, IL (US)

(73) Assignee: The Nielsen Company (US), LLC, New York, NY (US)

( * ) Notice: Subject to any disclaimer, the term of this patent is extended or adjusted under 35 U.S.C. 154(b) by 659 days.

(21) Appl. No.: 14/501,821

(22) Filed: Sep. 30, 2014

(65) Prior Publication Data

US 2015/0227966 A1    Aug. 13, 2015

Related U.S. Application Data

(60) Provisional application No. 61/938,585, filed on Feb. 11, 2014, provisional application No. 62/044,748, filed on Sep. 2, 2014.

(51) Int. Cl.
*G06Q 30/00* (2012.01)
*G06Q 30/02* (2012.01)

(52) U.S. Cl.
CPC ..... *G06Q 30/0246* (2013.01); *G06Q 30/0243* (2013.01)

(58) Field of Classification Search
None
See application file for complete search history.

(56) References Cited

U.S. PATENT DOCUMENTS 4,099,591 A  7/1978 Carr
4,973,952 A  11/1990 Malec et al.
(Continued)

FOREIGN PATENT DOCUMENTS

CA  2073387  1/1993
EP  1026847  8/2000
(Continued)

OTHER PUBLICATIONS

Using single source data to select TV programs: Part II Author: Assael, Henry; Poltrack, David F, Journal of Advertising Research 33.1 (Jan./Feb. 1993): 48.*

(Continued)

*Primary Examiner* — Matthew T Sittner
(74) *Attorney, Agent, or Firm* — Hanley, Flight & Zimmerman, LLC

(57) ABSTRACT

Methods, apparatus, systems and articles of manufacture are disclosed to generate a media rank. An example disclosed method includes (a) identifying households in which the product of interest was purchased, (b) calculating consumption factors for respective ones of the households based on a consumption total of the product of interest for the corresponding household and a household weight, (c) selecting first candidate media of interest, (d) calculating a rating value indicative of a relevance of the product of interest to the candidate media of interest based on the mathematical product of the consumption factor and a viewing time for corresponding ones of the households, (e) repeating (c) and (d) for second media, and (f) ranking the first and second media for the product of interest.

17 Claims, 8 Drawing Sheets

(56) References Cited

U.S. PATENT DOCUMENTS

| | | |
|---|---|---|
| 4,990,892 A | 2/1991 | Guest et al. |
| 5,014,206 A | 5/1991 | Scribner et al. |
| 5,119,104 A | 6/1992 | Heller |
| 5,214,687 A | 5/1993 | Kansakoski et al. |
| 5,227,874 A | 7/1993 | Von Kohorn |
| 5,233,642 A | 8/1993 | Renton |
| 5,234,345 A | 8/1993 | Weinblatt |
| 5,241,534 A | 8/1993 | Omuro et al. |
| 5,287,266 A | 2/1994 | Malec et al. |
| 5,294,781 A | 3/1994 | Takahashi et al. |
| 5,319,638 A | 6/1994 | Lin |
| 5,345,392 A | 9/1994 | Mito et al. |
| 5,374,951 A | 12/1994 | Welsh |
| 5,444,745 A | 8/1995 | Ali-Vehmas |
| 5,461,390 A | 10/1995 | Hoshen |
| 5,483,276 A | 1/1996 | Brooks et al. |
| 5,497,373 A | 3/1996 | Hulen et al. |
| 5,521,907 A | 5/1996 | Ennis, Jr. et al. |
| 5,580,254 A | 12/1996 | Ramsey |
| 5,603,095 A | 2/1997 | Uola |
| 5,640,002 A | 6/1997 | Ruppert et al. |
| 5,642,353 A | 6/1997 | Roy, III et al. |
| 5,675,510 A | 10/1997 | Coffey et al. |
| 5,686,888 A | 11/1997 | Welles, II et al. |
| 5,692,215 A | 11/1997 | Kutzik et al. |
| 5,740,035 A | 4/1998 | Cohen et al. |
| 5,768,680 A | 6/1998 | Thomas |
| 5,771,307 A | 6/1998 | Lu et al. |
| 5,799,154 A | 8/1998 | Kuriyan |
| 5,821,513 A | 10/1998 | O'Hagan et al. |
| 5,825,283 A | 10/1998 | Camhi |
| 5,859,838 A | 1/1999 | Soliman |
| 5,867,110 A | 2/1999 | Naito et al. |
| 5,878,384 A | 3/1999 | Johnson et al. |
| 5,966,696 A | 10/1999 | Giraud |
| 5,978,657 A | 11/1999 | Suzuki |
| 5,987,306 A | 11/1999 | Nilsen et al. |
| 5,991,735 A | 11/1999 | Gerace |
| 6,091,956 A | 7/2000 | Hollenberg |
| 6,098,048 A | 8/2000 | Dashefsky et al. |
| 6,108,637 A | 8/2000 | Blumenau |
| 6,115,680 A | 9/2000 | Coffee et al. |
| 6,252,522 B1 | 6/2001 | Hampton et al. |
| 6,286,005 B1 * | 9/2001 | Cannon ................ G06Q 30/02 455/2.01 |
| 6,353,929 B1 | 3/2002 | Houston |
| 6,370,629 B1 | 4/2002 | Hastings et al. |
| 6,397,256 B1 | 5/2002 | Chan et al. |
| 6,433,689 B1 | 8/2002 | Hovind et al. |
| 6,470,386 B1 | 10/2002 | Combar et al. |
| 6,477,504 B1 | 11/2002 | Hamlin et al. |
| 6,480,497 B1 | 11/2002 | Flammer, III et al. |
| 6,493,649 B1 | 12/2002 | Jones et al. |
| 6,507,802 B1 | 1/2003 | Payton et al. |
| 6,516,189 B1 | 2/2003 | Frangione et al. |
| 6,546,257 B1 | 4/2003 | Stewart |
| 6,571,279 B1 | 5/2003 | Herz et al. |
| 6,574,614 B1 | 6/2003 | Kesel |
| 6,581,025 B2 | 6/2003 | Lehman |
| 6,584,375 B2 | 6/2003 | Bancroft et al. |
| 6,587,835 B1 | 7/2003 | Treyz et al. |
| 6,606,605 B1 | 8/2003 | Kolls |
| 6,647,269 B2 | 11/2003 | Hendrey et al. |
| 6,720,876 B1 | 4/2004 | Burgess |
| 6,745,011 B1 | 6/2004 | Hendrickson et al. |
| 6,754,470 B2 | 6/2004 | Hendrickson et al. |
| 6,772,129 B2 | 8/2004 | Alvarez et al. |
| 6,774,797 B2 | 8/2004 | Freathy et al. |
| 6,807,515 B2 | 10/2004 | Vogel et al. |
| 6,834,308 B1 | 12/2004 | Ikezoye et al. |
| 6,837,436 B2 | 1/2005 | Swartz et al. |
| 6,912,507 B1 | 6/2005 | Phillips et al. |
| 6,928,280 B1 | 8/2005 | Xanthos et al. |
| 6,940,403 B2 | 9/2005 | Kail, IV |
| 6,958,710 B2 | 10/2005 | Zhang et al. |
| 6,968,178 B2 | 11/2005 | Pradhan et al. |
| 6,970,131 B2 | 11/2005 | Percy et al. |
| 6,980,149 B1 | 12/2005 | Meyer |
| 7,013,136 B2 | 3/2006 | Frangione et al. |
| 7,013,478 B1 | 3/2006 | Hendricks et al. |
| 7,038,619 B2 | 5/2006 | Percy et al. |
| 7,092,964 B2 | 8/2006 | Dougherty et al. |
| 7,127,261 B2 | 10/2006 | Van Erlach |
| 7,149,549 B1 | 12/2006 | Ortiz et al. |
| 7,155,159 B1 | 12/2006 | Weinblatt et al. |
| 7,155,210 B2 | 12/2006 | Benson |
| 7,167,703 B2 | 1/2007 | Graham et al. |
| 7,176,834 B2 | 2/2007 | Percy et al. |
| 7,188,355 B1 | 3/2007 | Prokopenko et al. |
| 7,194,758 B1 | 3/2007 | Waki et al. |
| 7,206,647 B2 | 4/2007 | Kumar |
| 7,206,753 B2 | 4/2007 | Bancroft et al. |
| 7,212,979 B1 | 5/2007 | Matz et al. |
| 7,215,280 B1 | 5/2007 | Percy et al. |
| 7,227,498 B2 | 6/2007 | Soliman |
| 7,239,981 B2 | 7/2007 | Kolessar et al. |
| 7,272,982 B2 | 9/2007 | Neuhauser et al. |
| 7,295,108 B2 | 11/2007 | Corrado et al. |
| 7,408,460 B2 | 8/2008 | Crystal et al. |
| 7,408,502 B2 | 8/2008 | Percy et al. |
| 7,420,464 B2 | 9/2008 | Fitzgerald et al. |
| 7,460,827 B2 | 12/2008 | Schuster et al. |
| 7,463,143 B2 | 12/2008 | Forr et al. |
| 7,466,241 B2 | 12/2008 | Lyle et al. |
| 7,471,987 B2 | 12/2008 | Crystal et al. |
| 7,586,439 B2 | 9/2009 | Percy et al. |
| 7,587,732 B2 | 9/2009 | Wright et al. |
| 7,592,908 B2 | 9/2009 | Zhang et al. |
| 7,593,858 B2 | 9/2009 | Matz et al. |
| 7,630,867 B2 | 12/2009 | Behrens et al. |
| 7,636,742 B1 | 12/2009 | Olavarrieta et al. |
| 7,710,267 B2 | 5/2010 | Toyokawa et al. |
| 8,098,152 B2 | 1/2012 | Zhang et al. |
| 8,185,351 B2 | 5/2012 | Crystal et al. |
| 8,229,469 B2 | 7/2012 | Zhang et al. |
| 8,239,393 B1 * | 8/2012 | Guo ................ G06F 17/30702 707/748 |
| 8,548,820 B2 | 10/2013 | Matz et al. |
| 8,595,069 B2 | 11/2013 | Shkedi et al. |
| 8,607,295 B2 | 12/2013 | Bhatia et al. |
| 9,027,127 B1 * | 5/2015 | Soldo ................ H04L 63/1425 705/14.2 |
| 2001/0037232 A1 | 11/2001 | Miller |
| 2002/0002504 A1 | 1/2002 | Engel et al. |
| 2002/0004740 A1 | 1/2002 | Shotey et al. |
| 2002/0008623 A1 | 1/2002 | Garber et al. |
| 2002/0010757 A1 | 1/2002 | Granik et al. |
| 2002/0022488 A1 | 2/2002 | Srinivasan et al. |
| 2002/0025795 A1 | 2/2002 | Sharon et al. |
| 2002/0047440 A1 | 4/2002 | Leijon et al. |
| 2002/0059218 A1 | 5/2002 | August et al. |
| 2002/0097193 A1 | 7/2002 | Powers |
| 2002/0104083 A1 | 8/2002 | Hendricks et al. |
| 2002/0107027 A1 | 8/2002 | O'Neil |
| 2002/0111847 A1 | 8/2002 | Smith, II |
| 2002/0112048 A1 | 8/2002 | Gruyer et al. |
| 2002/0128898 A1 | 9/2002 | Smith, Jr. et al. |
| 2002/0160758 A1 | 10/2002 | Pradhan et al. |
| 2002/0174222 A1 | 11/2002 | Cox |
| 2002/0196275 A1 | 12/2002 | Willner et al. |
| 2003/0054757 A1 | 3/2003 | Kolessar et al. |
| 2003/0055707 A1 | 3/2003 | Busche et al. |
| 2003/0063222 A1 | 4/2003 | Creed et al. |
| 2003/0097302 A1 | 5/2003 | Overhultz et al. |
| 2003/0115586 A1 | 6/2003 | Lejouan et al. |
| 2003/0122708 A1 | 7/2003 | Percy et al. |
| 2003/0144899 A1 | 7/2003 | Kokubo |
| 2003/0158776 A1 | 8/2003 | Landesmann |
| 2003/0171833 A1 | 9/2003 | Crystal et al. |
| 2003/0171975 A1 | 9/2003 | Kirshenbaum et al. |
| 2003/0172375 A1 | 9/2003 | Shaw et al. |
| 2003/0177488 A1 | 9/2003 | Smith et al. |
| 2003/0191653 A1 | 10/2003 | Birnbaum et al. |
| 2003/0200137 A1 | 10/2003 | Drummond |

(56) References Cited

U.S. PATENT DOCUMENTS

| | | | |
|---|---|---|---|
| 2004/0015399 A1 | 1/2004 | Maggio | |
| 2004/0054627 A1 | 3/2004 | Rutledge | |
| 2004/0080452 A1 | 4/2004 | Percy et al. | |
| 2004/0088246 A1 | 5/2004 | Jepsen et al. | |
| 2004/0260470 A1 | 12/2004 | Rast | |
| 2005/0035857 A1 | 2/2005 | Zhang et al. | |
| 2005/0049913 A1* | 3/2005 | Huddleston | G06K 9/6228 706/13 |
| 2005/0071219 A1 | 3/2005 | Kahlert et al. | |
| 2005/0102696 A1 | 5/2005 | Westberg | |
| 2005/0136903 A1 | 6/2005 | Kashima et al. | |
| 2005/0144632 A1 | 6/2005 | Mears et al. | |
| 2005/0201826 A1 | 9/2005 | Zhang et al. | |
| 2005/0203798 A1 | 9/2005 | Jensen et al. | |
| 2005/0216509 A1 | 9/2005 | Kolessar et al. | |
| 2005/0243784 A1 | 11/2005 | Fitzgerald et al. | |
| 2005/0264430 A1 | 12/2005 | Zhang et al. | |
| 2005/0272015 A1 | 12/2005 | Jensen et al. | |
| 2005/0272016 A1 | 12/2005 | Jensen et al. | |
| 2005/0272017 A1 | 12/2005 | Neuhauser et al. | |
| 2005/0272018 A1 | 12/2005 | Crystal et al. | |
| 2005/0273802 A1 | 12/2005 | Crystal et al. | |
| 2006/0003732 A1 | 1/2006 | Neuhauser et al. | |
| 2006/0004627 A1 | 1/2006 | Baluja | |
| 2006/0019723 A1 | 1/2006 | Vorenkamp et al. | |
| 2006/0028953 A1 | 2/2006 | Jensen et al. | |
| 2006/0041615 A1 | 2/2006 | Blank et al. | |
| 2006/0053050 A1 | 3/2006 | Schweier | |
| 2006/0053110 A1 | 3/2006 | McDonald et al. | |
| 2006/0098027 A1 | 5/2006 | Rice et al. | |
| 2006/0111962 A1 | 5/2006 | Holsinger | |
| 2006/0164230 A1 | 7/2006 | Dewind et al. | |
| 2006/0168613 A1 | 7/2006 | Wood et al. | |
| 2006/0173880 A1 | 8/2006 | Alberts et al. | |
| 2006/0259922 A1 | 11/2006 | Sandgren et al. | |
| 2006/0270401 A1 | 11/2006 | Frangione et al. | |
| 2006/0284981 A1 | 12/2006 | Erol et al. | |
| 2006/0294225 A1 | 12/2006 | Grecco et al. | |
| 2007/0011040 A1 | 1/2007 | Wright et al. | |
| 2007/0038516 A1 | 2/2007 | Apple et al. | |
| 2007/0079331 A1 | 4/2007 | Datta et al. | |
| 2007/0088801 A1 | 4/2007 | Levkovitz et al. | |
| 2007/0156324 A1 | 7/2007 | Percy et al. | |
| 2007/0192168 A1 | 8/2007 | Van Luchene | |
| 2007/0288272 A1 | 12/2007 | Marks et al. | |
| 2007/0288277 A1 | 12/2007 | Neuhauser et al. | |
| 2007/0288476 A1 | 12/2007 | Flanagan, III et al. | |
| 2007/0294057 A1 | 12/2007 | Crystal et al. | |
| 2007/0294705 A1 | 12/2007 | Gopalakrishnan et al. | |
| 2007/0294706 A1 | 12/2007 | Neuhauser et al. | |
| 2008/0004951 A1 | 1/2008 | Huang et al. | |
| 2008/0010110 A1 | 1/2008 | Neuhauser et al. | |
| 2008/0033776 A1* | 2/2008 | Marchese | G06Q 20/10 705/7.33 |
| 2008/0051033 A1 | 2/2008 | Hymes | |
| 2008/0086304 A1 | 4/2008 | Neuhauser | |
| 2008/0086533 A1 | 4/2008 | Neuhauser et al. | |
| 2008/0091087 A1 | 4/2008 | Neuhauser et al. | |
| 2008/0091451 A1 | 4/2008 | Crystal | |
| 2008/0091524 A1* | 4/2008 | Yan | G06Q 30/02 705/14.45 |
| 2008/0091762 A1 | 4/2008 | Neuhauser et al. | |
| 2008/0109391 A1 | 5/2008 | Chan | |
| 2008/0126420 A1 | 5/2008 | Wright et al. | |
| 2008/0133291 A1 | 6/2008 | Nasser et al. | |
| 2008/0140479 A1 | 6/2008 | Mello et al. | |
| 2008/0154717 A1* | 6/2008 | Saifee | G06Q 30/02 705/14.6 |
| 2008/0162385 A1* | 7/2008 | Madani | G06F 17/30707 706/12 |
| 2008/0172261 A1 | 7/2008 | Albertson et al. | |
| 2008/0177695 A1 | 7/2008 | Nasser et al. | |
| 2008/0191934 A1 | 8/2008 | Baker et al. | |
| 2008/0243573 A1 | 10/2008 | Nasser et al. | |
| 2008/0243590 A1 | 10/2008 | Rich | |
| 2008/0249859 A1 | 10/2008 | Angell et al. | |
| 2008/0270154 A1* | 10/2008 | Klots | G06Q 30/02 705/14.4 |
| 2009/0013048 A1 | 1/2009 | Partaker et al. | |
| 2009/0013091 A1 | 1/2009 | Zhang et al. | |
| 2009/0037575 A1 | 2/2009 | Crystal et al. | |
| 2009/0073035 A1 | 3/2009 | Percy et al. | |
| 2009/0132336 A1* | 5/2009 | Demir | G06Q 30/02 705/7.29 |
| 2009/0164284 A1 | 6/2009 | Koiso et al. | |
| 2009/0171767 A1 | 7/2009 | Kolessar | |
| 2009/0210470 A1* | 8/2009 | Sarlos | G06K 9/6282 708/400 |
| 2009/0222325 A1 | 9/2009 | Anderson et al. | |
| 2009/0265230 A1* | 10/2009 | Plachouras | G06Q 30/02 705/14.54 |
| 2009/0276235 A1 | 11/2009 | Benezra et al. | |
| 2009/0294132 A1 | 12/2009 | Donald et al. | |
| 2010/0206949 A1 | 8/2010 | Mattlin et al. | |
| 2010/0268524 A1* | 10/2010 | Nath | H04L 67/22 703/23 |
| 2010/0268540 A1 | 10/2010 | Arshi et al. | |
| 2010/0268573 A1 | 10/2010 | Jain et al. | |
| 2010/0268834 A1* | 10/2010 | Eidelman | H04L 12/2697 709/230 |
| 2010/0269044 A1* | 10/2010 | Ivanyi | G06Q 30/02 715/736 |
| 2010/0299303 A1* | 11/2010 | Horster | G06F 17/30029 706/52 |
| 2010/0312624 A1* | 12/2010 | Bilenko | G06Q 30/02 705/14.5 |
| 2011/0016065 A1* | 1/2011 | Chapelle | G06N 99/005 706/12 |
| 2011/0099142 A1 | 4/2011 | Karjalainen et al. | |
| 2011/0106587 A1 | 5/2011 | Lynch et al. | |
| 2011/0224992 A1 | 9/2011 | Chaoui et al. | |
| 2011/0313849 A1 | 12/2011 | Brueck et al. | |
| 2012/0005018 A1* | 1/2012 | Narayanan | G06Q 10/067 705/14.52 |
| 2012/0005204 A1* | 1/2012 | Diaz | G06N 99/005 707/733 |
| 2012/0130802 A1 | 5/2012 | Shimizu | |
| 2012/0245978 A1 | 9/2012 | Jain et al. | |
| 2013/0018968 A1* | 1/2013 | Pennacchiotti | G06Q 10/10 709/206 |
| 2013/0173571 A1* | 7/2013 | Chen | G06F 17/30 707/706 |
| 2013/0297778 A1* | 11/2013 | Hong | G06F 17/3089 709/224 |
| 2015/0039541 A1* | 2/2015 | Kapur | G06N 5/04 706/12 |
| 2015/0088644 A1* | 3/2015 | Shay | G06O 30/0254 705/14.52 |
| 2015/0205462 A1* | 7/2015 | Jitkoff | G06F 3/0483 715/777 |
| 2016/0071496 A1* | 3/2016 | Jones | G06T 3/0075 345/636 |
| 2016/0148255 A1* | 5/2016 | Shariat | G06Q 30/0255 705/14.53 |
| 2016/0267525 A1* | 9/2016 | Lin | G06Q 30/02 |

FOREIGN PATENT DOCUMENTS

| | | |
|---|---|---|
| EP | 1133090 | 2/2008 |
| JP | 11259422 | 9/1999 |
| JP | 11259558 | 9/1999 |
| JP | 2000209578 | 7/2000 |
| JP | 2008197266 | 8/2008 |
| WO | 9417609 | 8/1994 |
| WO | 9955057 | 10/1999 |
| WO | 0215086 | 2/2002 |
| WO | 2073885 | 9/2002 |
| WO | 2098029 | 12/2002 |
| WO | 03087871 | 10/2003 |
| WO | 2004051303 | 6/2004 |
| WO | 2005019853 | 3/2005 |

(56) References Cited

FOREIGN PATENT DOCUMENTS

| WO | 2006015188 | 2/2006 |
|---|---|---|
| WO | 2006015339 | 2/2006 |
| WO | 2006098414 | 9/2006 |
| WO | 2007044356 | 4/2007 |
| WO | 2007073484 | 6/2007 |
| WO | 2008118119 | 10/2008 |

OTHER PUBLICATIONS

Aaker et al, "Marketing Research," John Wiley and Sons, Inc., 2001, retrieved from <www.MeansBusiness.com>, retrieved on Jul. 30, 2003 (36 pages).
Abrams et al., "Personalized Ad Delivery When Ads Fatigue: An Approximation Algorithm," Yahoo! Research, WINE, 2007 (6 pages).
Assael et al., "Consumer Surveys vs. Electronic Measures for Single-Source Data," Journal of Advertising Research, Sep.-Oct. 2002 (8 pages).
Azondekon et al., "Service Selection in Networks Based on Proximity Confirmation Using Infrared," retrieved from <http://www.scs.carleton.ca/~barbeau/Publications/2002/azondekon.pdf, International Conference on TeleCommunications (ICT) Beijing, 2002 (5 pages).
Bahl et al., "A Software System for Locating Mobile Users: Design, Evaluation, and Lessons," Technical Report MSRTR-2000-12 Microsoft Research, retrieved from <http://research.microsoft.com/~bahl/Papers/Pdf/radar.pdf>, Feb. 2000 (13 pages).
Balakrishnan et al., "A Comparison of Mechanisms for Improving TCP Performance Over Wireless Links," ACM SIGCOMM '96, Stanford CA, Aug. 1996 (14 pages).
Battiti et al., "Location-Aware Computing: a Neural Network Model for Determining Location in Wireless LANS," University of Trento: Department of Information and Communication Technology, Technical Report, #DIT-02-0083, Feb. 2002 (17 pages).
Breen, "An Industry of the Verge," In-Store Marketing Institute, Oct. 1, 2007 (16 pages).
Byfield, "A Consumer Insight Perspective-Global Media Change," The New Medium of Television, retrieved from <http://www.idigitalsales.co.uk>, 2004 (6 pages).
Byfield et al., "The Digital Revolution: Will it Lead to the Ultimate Demise of Newspapers?" Worldwide Readership Research Symposium 1999, Session 10.3, 1999 (10 pages).
Camp et al., "A Survey of Mobility Models for Ad Hoc Network Research," Department of Math and Computer Sciences, Colorado School of Mines, Golden CO, Sep. 10, 2002 (27 pages).
Clark, "Shopping with Detectives: Customer Tracking Takes the Mystery Out of Store Design (The Digital Store)," Display & Design Ideas, vol. 14, No. 5, May 2002 (2 pages).
Dunnett et al., "An Evaluation of Cinema Advertising Effectiveness," Marketing Bulletin, vol. 7, Research Note 2, 1996 (7 pages).
Reitsma, "Understanding and Harnessing Mobile Research," FORRESTER, Apr. 23, 2009 (33 pages).
Guzdial et al., "Analyzing and Visualizing Log Files; A Computational Science of Usability," GVU Center, College of Computing, Georgia Institute of Technology, 1994 (17 pages).
Haitsma et al., "A Highly Robust Audio Fingerprinting System," retrieved from <https://wikis.utexas.edu/.../ismir2002.pdf >, 2002 (9 pages).
International Searching Authority, "International Search Report," issued in connection with International Patent Application No. PCT/FI2009/050186, dated Dec. 1, 2009 (4 pages).
International Bureau, "International Preliminary Report on Patentability," issued in connection with International Patent Application No. PCT/US2007/080235, dated Apr. 16, 2009 (8 pages).
International Searching Authority, "International Search Report," issued in connection with International Patent Application No. PCT/US2007/080235, dated Aug. 25, 2008 (4 pages).
International Searching Authority, "Written Opinion" issued in connection with International Patent Application No. PCT/US2007/080235, dated Aug. 25, 2008 (6 pages).
International Searching Authority, "Written Opinion" issued in connection with International Patent Application No. PCT/US2008/056282, dated Aug. 21, 2008 (5 pages).
Jain et al., "Congestion Avoidance in Computer Networks with a Connectionless Network Layer," Digital Equipment Corporation, 1988, Version Jun. 1, 1997 (21 pages).
Ko, "Automatic Call Generation and Analysis-Network Testing and Cellularsurvey Tools," (Abstract), Making Life Easier-Network Design and Management Tools (Digest No. 1996/217), Oct. 10, 1996 (1 page).
Lang Research, "Qualiquant Analytic Techniques," retrieved from <http://www.langresearch.ca/qualiqua.html>, retrieved on Apr. 29, 2009 (2 pages).
Lee et al., "Repeat Exposure Effects of Internet Advertising," HEC School of Management, Paris, and Hong Kong University of Science and Technology, 2005, retrieved from <www.hec.fr/heccontent/download/4968/117034/version/2/.../CR809.pdf> (29 pages).
Nandan et al., "AdTorrent: Digital Billboards for Vehicular Networks," IEEE/ACM International Workshop on Vehicle -to-Vehicle Communications, 2005 (9 pages).
Nielsen, "Gain a Holistic View of Consumers," The Nielsen Company, 2009 (2 pages).
Probst, "How a Customers First Impression Impacts Sales Effectiveness in an Automotive Retail Facility with Correlation to the Purchasing Decision," The Graduate College, University of Wisconsin-Stout, Jan. 2004 (47 pages).
Schlosser et al., "Survey of Internet Users' Attitudes Toward Internet Advertising," Journal of Interactive Marketing, vol. 13, No. 3, Summer 1999 (21 pages).
Turley et al., "The Impact and Effectiveness of Advertisements in a Sports Arena," Journal of Services Marketing, vol. 14, No. 4, 2000 (14 pages).
United States Patent and Trademark Office, "Final Office Action," issued in connection with U.S. Appl. No. 12/263,079, dated May 10, 2012 (34 pages).
United States Patent and Trademark Office, "Final Office Action," issued in connection with U.S. Appl. No. 12/263,079, dated Jul. 22, 2013 (52 pages).
United States Patent and Trademark Office, "Final Office Action," issued in connection with U.S. Appl. No. 12/263,079, dated Jun. 2, 2015 (59 pages).
United States Patent and Trademark Office, "Non-Final Office Action," issued in connection with U.S. Appl. No. 12/263,079, dated Sep. 26, 2011 (22 pages).
United States Patent and Trademark Office, "Non-Final Office Action," issued in connection with U.S. Appl. No. 12/263,079, dated Sep. 13, 2012 (35 pages).
United States Patent and Trademark Office, "Non-Final Office Action," issued in connection with U.S. Appl. No. 12/263,079, dated Nov. 6, 2014 (43 pages).
United States Patent and Trademark Office, "Non-Final Office Action," issued in connection with U.S. Appl. No. 12/434,294, dated May 25, 2011 (27 pages).
United States Patent and Trademark Office, "Final Office Action," issued in connection with U.S. Appl. No. 12/434,294, dated Jan. 6, 2012 (32 pages).
United States Patent and Trademark Office, "Requirement for Restriction/Election," issued in connection with U.S. Appl. No. 13/001,492, dated Aug. 23, 2013 (6 pages).
Vucetic et al., "Network Management Applications for Wireless Local Loop," Electrotechnical Conference, vol. 2, May 1998 (5 pages).
Battelle, "Global Positioning Systems for Personal Travel Surveys: Lexington Area Travel Data Collection Test," Final Report to Office of Highway Information Management, Office of Technology Application, Sep. 15, 1997 (92 pages).
Ishii et al., "Detection of Attention Behavior for Marketing Information System," IEEE Cat No. 02EX649, 7th Annual International Conference on Control, Automation, Robotics and Vision, vol. 2, Dec. 2002 (6 pages).
Yang et al., "Customer Perceived Value, Satisfaction, and Loyalty: The Role of Switching Costs," Psychology and Marketing, vol. 21, No. 10, Oct. 2004 (24 pages).

(56) References Cited

OTHER PUBLICATIONS

Yeung et al., "A Comparative Study on Location Tracking Strategies in Cellular Mobile Radio Systems," Global Telecommunications Conference, 1995, Globecom '95, IEEE, Nov. 1995 (4 pages).

United States Patent and Trademark Office, "Examiner's Answer to Appeal," issued in connection with U.S. Appl. No. 12/263,079, dated Jul. 22, 2016 (45 pages).

United States Patent and Trademark Office, "Decision on Appeal," issued in connection with U.S. Appl. No. 12/263,079, dated Mar. 29, 2018, 13 pages.

\* cited by examiner

| HH # (304) | EXPOSURE TIME (306) | HH WEIGHT (308) | TOTAL PURCHASE $ (310) | VF (314) | PROGRAM MINUTES (316) | RAW RATING (318) | VRP NUMERATOR (320) |
|---|---|---|---|---|---|---|---|
| 1 | 4 min | 1.7 | $4 | 6.8 | 20 | 6.8 | 27.2 |
| 2 | 6 min | 1.2 | $3 | 3.6 | 20 | 7.2 | 21.6 |
| 3 | 12 min | 1.45 | $30 | 43.5 | 20 | 17.4 | 522 |
| 4 | 20 min | 1.15 | $20 | 23 | 20 | 23 | 460 |
| 5 | 8 min | 1.35 | $8 | 10.8 | 20 | 10.8 | 86.4 |
| 6 | 10 min | 1 | $0 | 0 | 20 | 10 | 0 |
| 7 | 12 min | 1.5 | $12 | 0 | 20 | 18 | 0 |
| 8 | 0 min | 1.65 | $0 | 19.8 | 20 | 0 | 0 |
| 9 | 0 min | 1.75 | $15 | 26.25 | 20 | 0 | 0 |
| 10 | 0 min | 1.8 | $0 | 0 | 20 | 0 | 0 |
| | | Σ 14.55 | Σ $92 | Σ 133.75 (326) | | Σ 93.2 | Σ 1117.2 (330) |

$$\text{Rating} = \frac{\Sigma(\text{Weight of HH} * \text{Program Viewing Time of HH})}{\Sigma(\text{Weights of all HH \& All Minutes Aired})} = 0.32027491$$

VRP Rating = 0.41764486 (328)

VRP Index = 130.4019 (332)

FIG. 3A

| HH # | EXPOSURE TIME | HH WEIGHT | TOTAL PURCHASE $ | VF | PROGRAM MINUTES | RAW RATING | VRP NUMERATOR |
|---|---|---|---|---|---|---|---|
| 1 | 4 min | 1.7 | $4 | 6.8 | 20 | 6.8 | 27.2 |
| 2 | 6 min | 1.2 | $3 | 3.6 | 20 | 7.2 | 21.6 |
| 3 | 12 min | 1.45 | $7 | 10.15 | 20 | 17.4 | 121.8 |
| 4 | 20 min | 1.15 | $10 | 11.5 | 20 | 23 | 230 |
| 5 | 8 min | 1.35 | $8 | 10.8 | 20 | 10.8 | 86.4 |
| 6 | 10 min | 1 | $0 | 0 | 20 | 10 | 0 |
| 7 | 12 min | 1.5 | $0 | 0 | 20 | 18 | 0 |
| 8 | 0 min | 1.65 | $12 | 19.8 | 20 | 0 | 0 |
| 9 | 0 min | 1.75 | $10 | 17.5 | 20 | 0 | 0 |
| 10 | 0 min | 1.8 | $0 | 0 | 20 | 0 | 0 |
|  |  | Σ 14.55 | Σ $54 | Σ 80.15 |  | Σ 93.2 | Σ 487 |

$$\text{Rating} = \frac{\Sigma(\text{Weight of HH} * \text{Program Viewing Time of HH})}{\Sigma(\text{Weights of all HH} * \text{All Minutes Aired})} = 0.32027491$$

VRP Rating = 0.0066505

VRP Index = 0.02076506

FIG. 3B

METHODS AND APPARATUS TO GENERATE A MEDIA RANK

RELATED APPLICATION

This patent claims the benefit of and priority to U.S. Provisional Patent Application Ser. No. 61/938,585, which was filed on Feb. 11, 2014, and claims the benefit of and priority to U.S. Provisional Patent Application Ser. No. 62/044,748, which was filed on Sep. 2, 2014, both of which are hereby incorporated herein by reference in their entireties.

FIELD OF THE DISCLOSURE

This disclosure relates generally to market research, and, more particularly, to methods and apparatus to generate a media rank.

BACKGROUND

Media research efforts typically include acquiring panelist behavior data from households. In some cases, the acquired panelist behavior data is compartmentalized into segments of particular age and/or gender groups, such as groups of males having ages between 18-24, females having ages between 24-36, etc. Product manufacturers, product/service marketers and/or other entities chartered with promotional responsibilities select a particular segment of the acquired panelist behavior (e.g., males having ages between 18-24) to identify behavioral information that may aid in advertising strategies to better target such segmented groups.

BRIEF DESCRIPTION OF THE DRAWINGS

FIGS. 3A and 3B are example volumetric rating point calculations generated by the example program ranking engine of FIG. 2.

DETAILED DESCRIPTION

Figure 1:
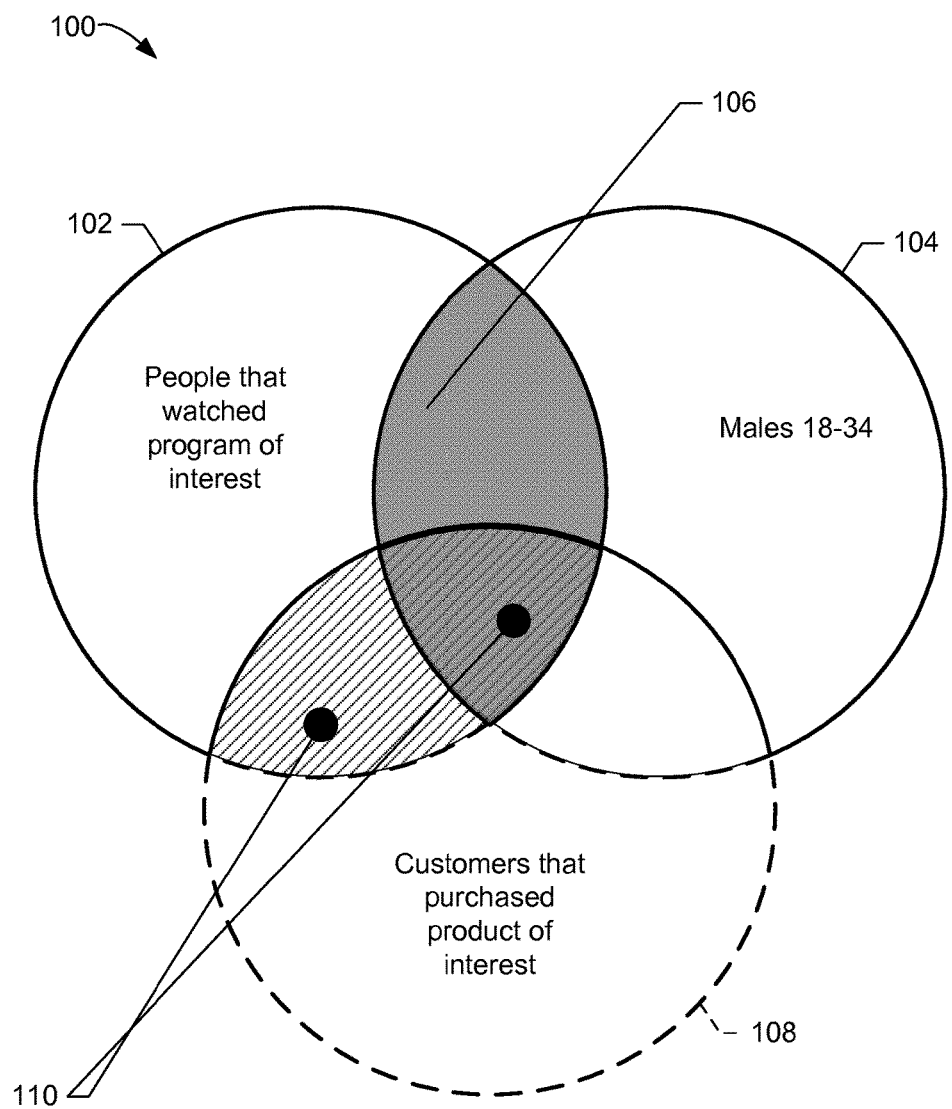
FIG. 1 is an example set diagram associating customers of different types.

Market researchers seek to understand an audience composition and how the audience behaves in response to one or more stimuli. One or more stimuli may be provided to the audience in the form of, for example, print advertisements, audio advertisements, video advertisements, on-line advertisements, etc. For any given stimulus, such as an advertisement (for a corresponding product and/or service) provided to an audience during a particular television program, the associated audience may have a corresponding degree of receptiveness to that stimulus. However, that same stimulus may have a greater or lesser degree of receptiveness when paired with a different television program.

Manufacturers of products and/or services have a finite amount of money to spend on advertising. Typically, television programs that are more popular also reach a larger audience. As a result, the television broadcaster charges more money to place advertisements on such programs, which results in an advertising cost increase associated with that particular television program. Despite the initial attractiveness of reaching more people via a relatively larger audience associated with a relatively popular television program, the fact that an audience is large does not actually provide any indication that the audience reflects consumers that actually purchase the product or service of interest. Therefore, techniques have been developed for comparing television programs on criteria other than audience size.

A traditional manner of weighting a television program to determine how it compares to one or more other television programs that could be targeted for advertising purposes includes using a time of viewing by each household. An example manner of weighting and/or otherwise comparatively rating a television program may be performed in a manner consistent with example Equation 1.

$$\text{Rating} = \frac{\sum \left( \text{Weight of } HH * \text{Program Viewing Time of } HH \right)}{\sum (\text{Weights of all } HHs * \text{All Minutes Aired})}. \quad \text{Equation 1}$$

In the illustrated example of Equation 1, HH refers to a Household, and the resulting Rating value provides a useful generalized reflection of household viewing of the television program of interest, but provides no indication and/or nexus as to whether the manufacturer's product/service of interest is suitable for the audience of the television program of interest. In some examples, the traditional program rating approach associated with example Equation 1 is performed in connection with a segmentation of interest that is selected by the market researcher. For example, a demographic segment associated with panelists that are male and having ages between 18-34 may be selected by the market researcher based on a discretionary decision that the selected segment is the target demographic likely to capture the most audience members having an interest in the corresponding product/service of interest. While such a discretionary marketing decision by the market researcher may be based on prior empirical observations of audience demographics associated with the product/service of interest, example Equation 1 and/or the selected demographic segment excludes purchase activity by audience members outside the selected segment of interest. As such, merely selecting a segment and applying the traditional rating approach based on a subjective hope that the selection accurately reflects the desired pool of consumers as described above may not be tied to actual purchase behaviors and, thus, a portion of potential buyers may well be excluded from consideration. This results in lost sales opportunities and less cost effective usage/placement of advertisements.

FIG. 1 is an example set diagram 100 illustrating relationships between people that watch a particular program and a demographic of interest. In the illustrated example of FIG. 1, a first set 102 reflects people that watch the program of interest, such as a particular television program, and a second set 104 reflects people associated with the demographic segment of interest, such as males having ages between 18-34. A first intersection 106 between the first set 102 and the second set 104 reflects a portion of people that both fit the desired segment of interest and watch the program of interest (e.g., the intersection of circle 102 and circle 104). Example Equation 1 determines a corresponding rating based on a weight of a household and a program viewing time of the household that, in the aggregate of other households having the segment of interest, results in the example first intersection 106. However, in the event that one or more consumers that is not within the demographic segment of interest purchase a product of interest, (e.g., people outside the second set 104 of males having ages between 18-34), then any result that attempts to rate the program of interest will suffer a degree of error.

In the illustrated example of FIG. 1, the set diagram 100 also includes a third set 108 that reflects customers that purchased the product (or service) of interest at least one time. The example first set 102 of people that watch the program of interest intersects the example third set 108 of customers that have purchased the product of interest at least one time to generate a second intersection 110 (i.e., the intersection of circle 102 and circle 108). As disclosed in further detail below, the second intersection 110 improves a rating accuracy of the program of interest by considering all people that have had any exposure to both the program of interest and that purchased the product/service of interest. In other words, while the example market researcher may correctly identify that the segment of interest (males having an age between 18-34) are the most representative group of purchasers for the product of interest, the example second intersection 110 does not exclude consumers that might not fit within the narrow, predefined, definition of the selected demographic segment when calculating a rating value and, thus is more representative of the target population of potential consumers.

Example methods, apparatus, systems and/or articles of manufacture disclosed herein consider both (a) consumer purchase behavior and (b) exposure behaviors when generating a rating value for media of interest, such as a television program. As disclosed in further detail below, households selected for analysis when generating a program rating are not based on a subjective segmentation capable of excluding one or more portions of a buying audience. Instead, examples disclosed herein consider all audience members that have had any purchase behavior associated with the product/service of interest.

Figure 2:
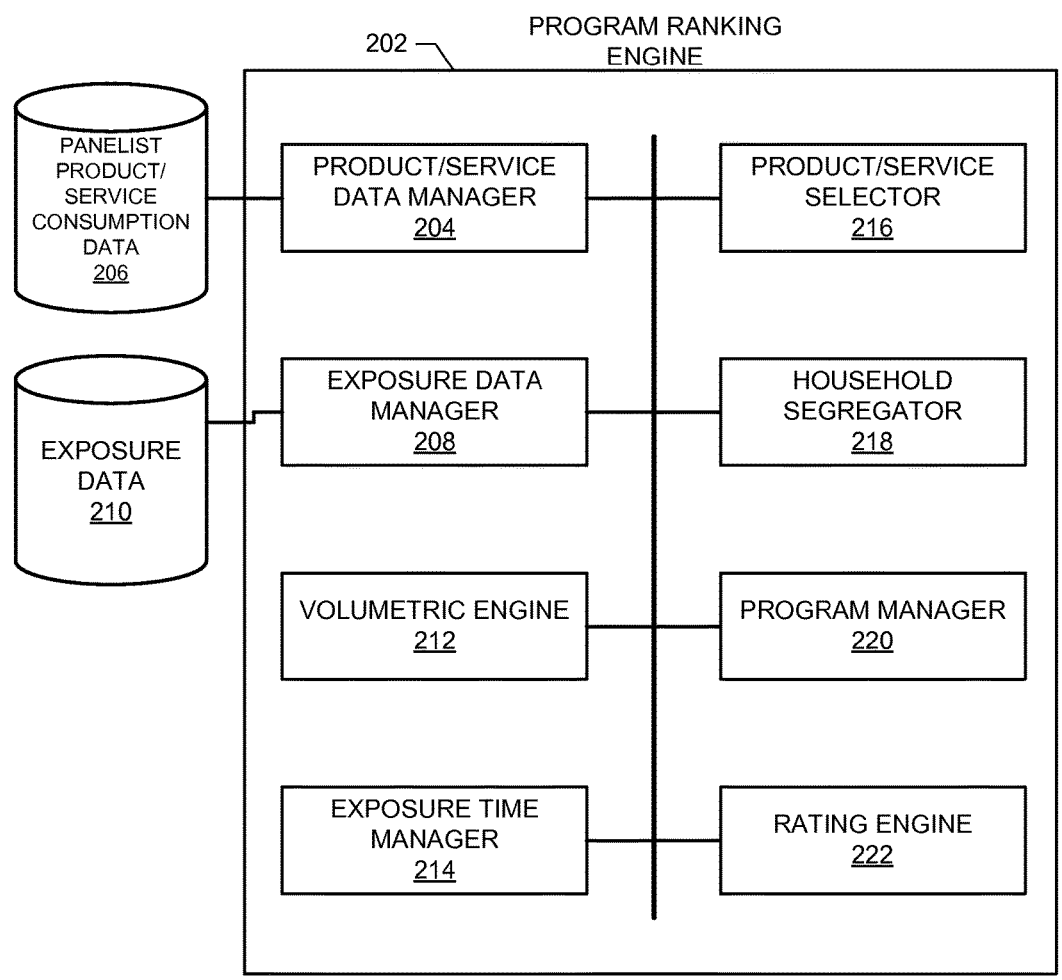
FIG. 2 is a schematic illustration of an example program ranking engine to generate a media rank for a product of interest.

FIG. 2 is a schematic illustration of an example program ranking engine 202 to generate a media rank for a product of interest. As used herein, "media" refers to any type of audio, still image, moving image, and/or combinations thereof presented and/or capable of being presented to an audience. Examples disclosed herein may refer to media or television programs for illustrative purposes, but such references are not intended to be limitations. Instead, examples disclosed herein can be applied to any form of media content and/or advertisements desired via any type of platform (e.g., television, radio, Internet, etc.). In the illustrated example of FIG. 2, the program ranking engine 202 includes a product data manager 204 communicatively connected to a panelist consumption data store 206, an exposure data manager 208 communicatively connected to an exposure data store 210, an volumetric engine 212, an exposure time manager 214, a product selector 216, a household segregator 218, a program manager 220, a rating engine 222, and a data and/or control bus 224 to facilitate communication within the example program ranking engine 202. In operation, the example product data manager 204 acquires product/service consumption data from any number of households, in which the product/service consumption data may include information relating to which products/services were purchased by the households, a number of trips taken by one or more household members to purchase the products/services of interest, and/or a number of units of the products/services purchased by one or more household members. Additionally, the example panelist consumption data store 206 includes information indicative of proportional amounts of such products/services purchased by such households. Product/service consumption data (e.g., purchase amounts) may be obtained (e.g., retrieved or received) from panelist data sources, preferred shopping lists, The Nielsen Homescan™ system, loyalty card data, etc. In some examples, product/service consumption data (e.g., dollars purchased, units purchased, trips taken for purchase of products/services, etc.) is cultivated by one or more data acquisition services, such as Nielsen's Homescan™ panel, in which participants scan product identifiers (e.g., barcodes) after purchasing the product(s).

The example exposure data manager 208 acquires exposure data from any number of households, in which the exposure data includes information relating to which media is accessed by the households and a duration of such media exposure on a per program basis. Exposure data may be obtained (e.g., retrieved or received) from panelist data sources, such as by way of Nielsen's A/P Meter and/or People Meter. To allow the market researcher to determine which media is best able to reach an audience having a preference for a product/service of interest, example methods, apparatus, systems and/or articles of manufacture disclosed herein process the obtained product/service consumption data and the exposure data to determine persons who exhibited actual product/service consumption behavior of the product/service of interest and who actually accessed candidate media (e.g., a television program with which to purchase advertising time). In some examples, the market researcher may have several different candidate media programs in which advertising time may be purchased. While some media programs may demand a relatively high price point due to a relative degree of popularity of the media program, the advertisement for the product/service to be advertised is not necessarily going to be as effective if purchased with the popular media program when compared to one or more other candidate media programs. As such, examples disclosed herein generate a relative metric that may be used to identify a relative score for each candidate media program in which a given advertisement may be purchased in view of the product/service being advertised. The relative score is indicative of a relevance between the product/service of interest and the corresponding candidate media.

The example product/service selector 216 of FIG. 2 identifies the product/service of interest to be evaluated in connection with candidate media programs in which advertisements may be purchased (e.g., either in a commercial slot or as an internal product placement (e.g., an actor wearing a watch to be advertised). In some examples, the product/service selector 216 includes a graphical user interface (GUI) to allow the market researcher to select which product/service is to be analyzed based on a list of products/services that have previously been purchased by panelists, as determined by the acquired purchase data from the example product/service data manager 204. The example household segregator 218 identifies corresponding households in which the selected product/service of interest was purchased at least once, and the example volumetric engine 212 calculates a volumetric factor based on a mathematical product of a consumption amount (e.g., a dollar amount purchased) during a purchase instance and a household weight value. The volumetric factor (VF) may be calculated using example Equation 2.

$$VF = \text{Weight of HH} * \text{HH Consumption of Product} \quad \text{Equation 2.}$$

In the illustrated example of Equation 2, VF refers to the Volumetric Factor, Consumption refers to one of dollars purchased, trips or units purchased, and HH refers to a household. The example VF of Equation 2 captures actual consumer consumption behavior in a proportionate manner, and yields a metric indicative of volume (e.g., brand volume) in relation to a total household consumption value. Even if a consumer of a household only consumes (e.g., purchases) a minimal amount of the product/service of interest, that household is considered in the rating analysis regardless of the demographics of the household (e.g., even if the household does not include members having a particular demographic characteristic (e.g., there are males having an age between 18-34 in the household)). In other words, calculation of the VF in a manner consistent with example Equation 2 derives a proportionate analysis without restricting the candidate audience to a specific demographic segment based on subjective decisions, such as a demographic segment selected by the potentially erroneous discretion of the market researcher.

After the example program ranking engine 202 calculates a VF for each household that has purchased the product/service of interest at least once, the example program manager 220 selects candidate media of interest. When faced with two or more choices of candidate media with which to associate advertising efforts for a product/service of interest, the market researcher must decide which candidate media will most effectively promote the product/service of interest (e.g., drive the most sales). The market researcher may begin an analysis of a first candidate media (e.g., a first television program) of interest for the product of interest, calculate a corresponding volumetric rating value, and then select a second candidate media of interest to calculate another corresponding volumetric rating value. After a desired number of candidate media of interest have been evaluated and corresponding volumetric rating values have been calculated, the market researcher may select the candidate media having the highest relative volumetric rating value as the one in which advertising efforts should be applied.

The example household segregator 218 selects a household from the previously generated list of households in which the product/service of interest has been purchased at least once. A subset of households having any amount of exposure time for the selected media of interest are generated by the example exposure time manager 214, and one of the households within the subset is selected for an initial analysis. The mathematical product of the previously calculated VF (also referred to herein as the consumption index) and the household exposure time is calculated by the example rating engine 222, and the sum of the instances of those products is calculated. This value is divided by the sum of all household weights, all purchased products, and a total number of minutes the program of interest was aired in a manner consistent with example Equation 3 to generate a value indicative of a relevance between the media of interest and the product/service of interest.

$$VRP \text{ Rating} = \frac{\sum (VF \text{ of } HH * \text{Exposure Time of } HH)}{\sum (VF \text{ of ALL } HHs) * \text{Total Program Minutes}}. \quad \text{Equation 3}$$

In the illustrated example of Equation 3, the VF of example Equation 2 is multiplied by household exposure time (numerator) divided by a representation of all purchased products of interest and a total number of minutes the program of interest aired (even if not exposed to a particular household). For each household (HH) that had both (a) at least one purchase instance of the product/service of interest and (b) at least some exposure time of the candidate media of interest, a corresponding VRP rating value is calculated. VRP ratings may then illustrate relative differences between any number of candidate media of interest in view of the product/service of interest, thereby identifying the best candidate media that is likely to reach and/or otherwise influence an audience during advertising efforts. Example Equation 4 calculates a VRP Index as a ratio of the VRP rating of Equation 3 and the example generalized program rating of example Equation 1.

$$VRP \text{ Index} = \frac{VRP \text{ Rating}}{\text{Generalized Rating}}. \quad \text{Equation 4}$$

FIGS. 3A and 3B are example tables illustrating calculating VRP Index values and VRP Rating values for two separate media (e.g., two separate television programs) of interest. In the illustrated example of FIG. 3A, a first table 302 is associated with a first television program of interest and includes a household identifier column 304, an exposure time column 306, a household weight column 308, a total purchase dollars column 310, a VF column 314, a total program minutes aired column 316, a raw rating column 318, and a VRP numerator column 320. The illustrated example second table 352 of FIG. 3B is structured similarly to the example first table 302 of FIG. 3A, but is associated with a second television program of interest. In particular, the example second table 352 includes a household identifier column 354, an exposure time column 356, a household weight column 358, a total purchase dollars column 360, a VF column 364, a total program minutes aired column 366, a raw rating column 368, and a VRP numerator column 370. In the example first table 302 and the example second table 352, example exposure times, example household weights, and example total purchase dollars are used for purposes of illustration. Additionally, while examples disclosed herein refer to purchase dollars, such as the example total purchase dollars column 310 and the example total purchase dollars column 360, example methods, apparatus, systems and/or articles of manufacture disclosed herein are not limited thereto. For example, example Equations 2-4 may be employed in view of trips (e.g., household member trip visits to a retailer) and/or units (e.g., number of units purchased by a household).

In the illustrated examples of FIGS. 3A and 3B, ten (10) example households are analyzed for the same product of interest. In the illustrated example first table 302, the example VF is calculated based on corresponding total purchase dollars (column 310) and household weights (column 308) using example Equation 2 to yield individualized VF values, as shown in the VF column 314. The individualized VF values are summed to a sum 326 for use with example Equation 3. A VRP rating 328 for the first program of interest is calculated using example Equation 3, which considers a VRP numerator sum 330 from the example VRP numerator column 320 for each household of interest divided by the VF sum 326 and the total number of minutes the program aired. The example VRP rating 328 value reflects a value indicative of a volumetric advantage (e.g., or disadvantage) of the first media when compared to one or more other candidate television programs of interest, such as the example television program of interest evaluated in FIG. 3B. Additionally, an example VRP index 332 is calculated by the example volumetric engine 212 based on a ratio of the VRP rating (Equation 3) and the generalized program rating (raw) associated with the first program of interest (Equation 1), as shown by example Equation 4.

In the illustrated example second table 352, the example VF is calculated based on corresponding total purchase dollars (column 360) and household weights (column 358) using example Equation 2 to yield individualized VF values, as shown in the VF column 364. The individualized VF values are summed to a sum 372 for use with example Equation 3. A VRP rating 374 for the second program of interest is calculated using example Equation 3, which considers a VRP numerator sum 376 from the example VRP numerator column 370 for each household of interest divided by the VF sum 372 and the total number of minutes the program aired (e.g., 20 minutes in this example). The example VRP rating 374 value is indicative of a volumetric advantage (e.g., or disadvantage) of the second media when compared to one or more other candidate programs (e.g., television programs, radio programs, etc.) of interest, such as the example television program of interest calculated above in view of FIG. 3A. Additionally, an example VRP index 378 is calculated by the example volumetric engine 212 based on a ratio of the VRP rating (Equation 3) and the generalized program rating (raw) associated with the second program of interest (Equation 1), as shown by example Equation 4.

While the illustrated examples of FIGS. 3A and 3B reflect two separate candidate programs of interest available for the market researcher to pursue for advertising exposure associated with the candidate product of interest, examples disclosed herein may evaluate any number of different candidate media to generate a ranking of all available candidate media. Based on the example exposure times and purchase dollars spent by the example households, the example first program has a relatively higher VRP rating value (i.e., 0.417644) when compared to the example second program (i.e., 0.00665). As such, the market researcher may select the example first program when spending advertising dollars for the product/service of interest.

While an example manner of implementing the program ranking engine 202 of FIG. 2 is illustrated in FIGS. 1, 2, 3A and 3B, one or more of the elements, processes and/or devices illustrated in FIG. 2 may be combined, divided, re-arranged, omitted, eliminated and/or implemented in any other way. Further, the example product data manager 204, the example panelist product/service consumption data store 206, the example exposure data manager 208, the example exposure data store 210, the example volumetric engine 212, the example exposure time manager 214, the example product selector 216, the example household segregator 218, the example program manager 220, the example rating engine and/or, more generally, the example program ranking engine 202 of FIG. 2 may be implemented by hardware, software, firmware and/or any combination of hardware, software and/or firmware. Thus, for example, any of the example product data manager 204, the example panelist product/service consumption data store 206, the example exposure data manager 208, the example exposure data store 210, the example volumetric engine 212, the example exposure time manager 214, the example product selector 216, the example household segregator 218, the example program manager 220, the example rating engine and/or, more generally, the example program ranking engine 202 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example product data manager 204, the example panelist product/service consumption data store 206, the example exposure data manager 208, the example exposure data store 210, the example volumetric engine 212, the example exposure time manager 214, the example product selector 216, the example household segregator 218, the example program manager 220, the example rating engine and/or, more generally, the example program ranking engine 202 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example program ranking engine 202 of FIG. 2 may include one or more elements, processes and/or devices in addition to, or instead of, those illustrated in FIG. 2, and/or may include more than one of any or all of the illustrated elements, processes and devices.

Figure 4:
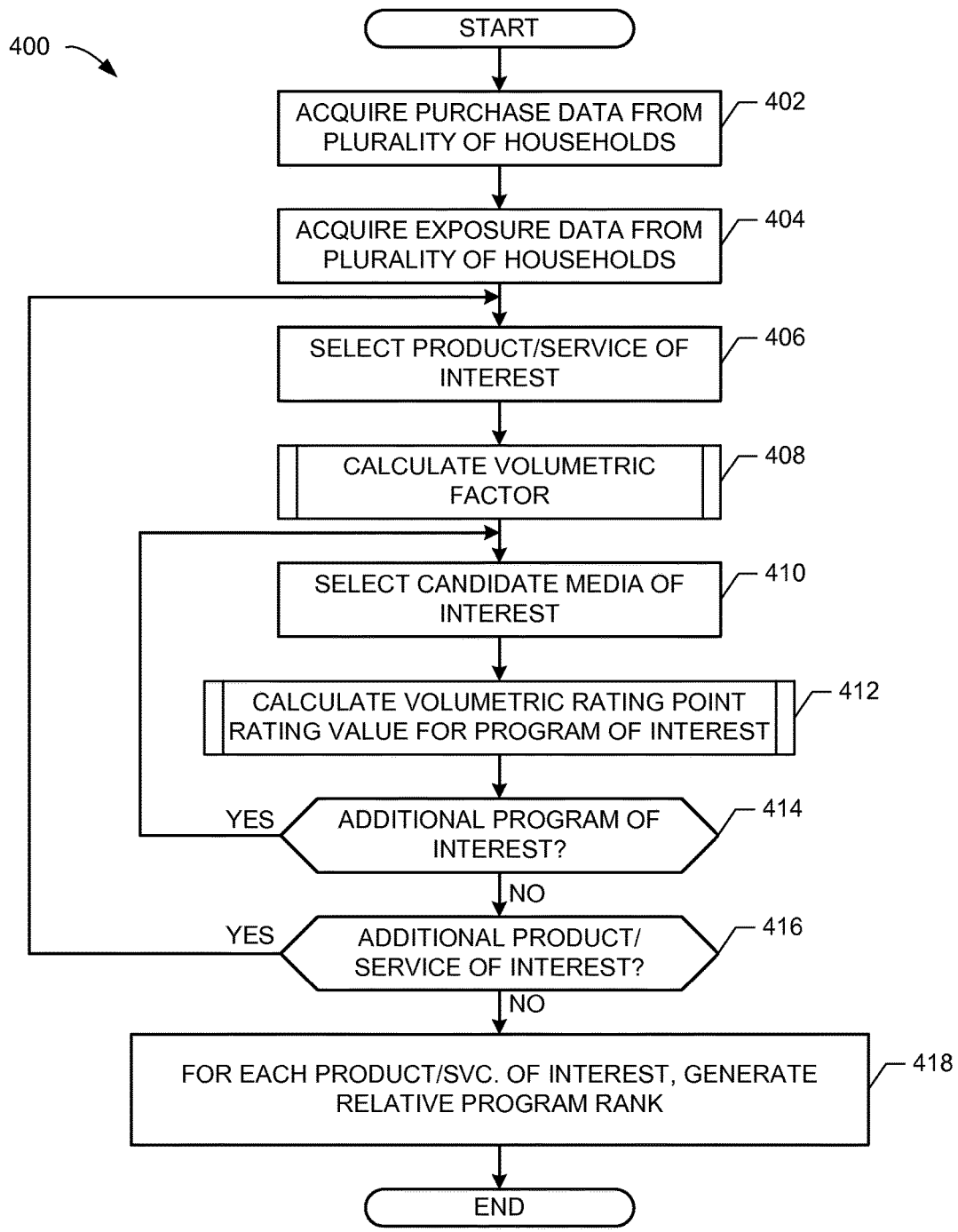
FIGS. 4-6 are flowcharts representative of example machine readable instructions that may be executed to implement the example program ranking engine of FIG. 2.
Figure 5:
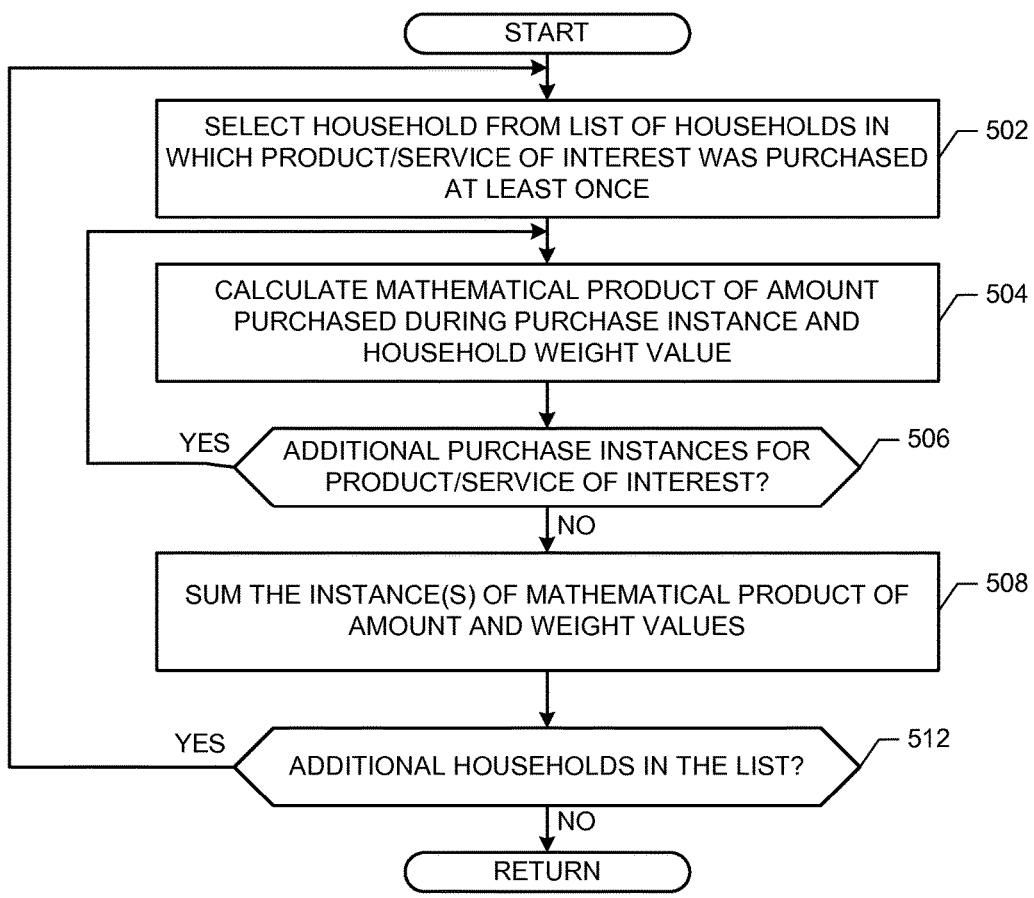
Figure 6:
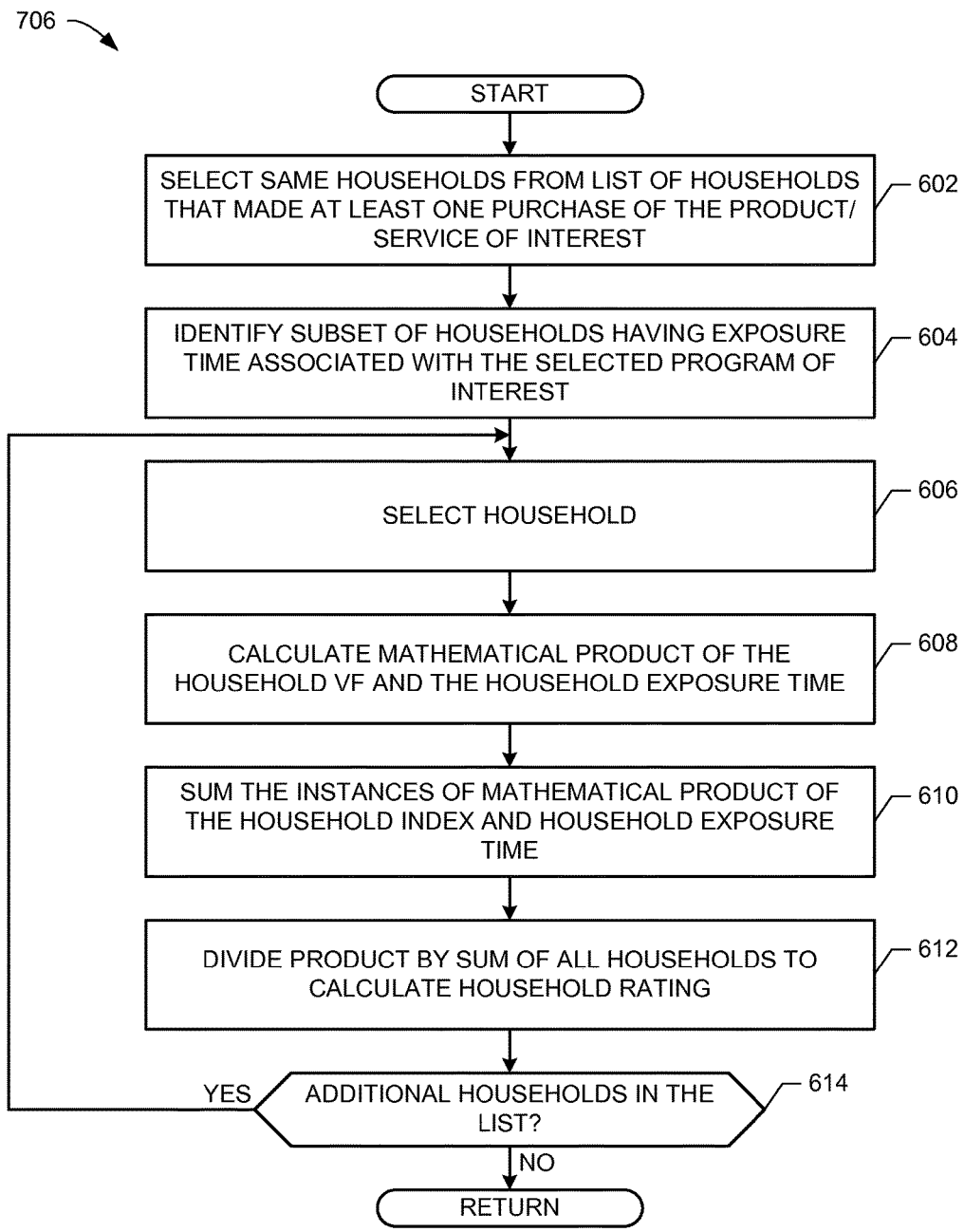

Flowcharts representative of example machine readable instructions for implementing the program ranking engine 202 of FIG. 2 are shown in FIGS. 4-6. In these examples, the machine readable instructions comprise programs for execution by a processor such as the processor 712 shown in the example processor platform 700 discussed below in connection with FIG. 7. The programs may be embodied in software stored on a tangible computer readable storage medium such as a CD-ROM, a floppy disk, a hard drive, a digital versatile disk (DVD), a Blu-ray disk, or a memory associated with the processor 712, but the entire programs and/or parts thereof could alternatively be executed by a device other than the processor 712 and/or embodied in firmware or dedicated hardware. Further, although the example programs are described with reference to the flowcharts illustrated in FIGS. 4-6, many other methods of implementing the example program ranking engine 202 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 400 of FIG. 4 begins at block 402 where the example product data manager 204 acquires consumption data (e.g., purchase data, units data, trips data, etc.) from a plurality of households, such as households that participate in panelist monitoring activity. Acquired product/service consumption data includes, but is not limited to, a dollar amount purchased by one or more members of the household for products and/or services, a number of trips taken to a retailer by one or more members of the household, a number of units purchased by one or more members of the household, etc. The example exposure data manager 208 acquires exposure data from the plurality of households (block 404). Acquired exposure data includes, but is not limited to, media consumed (e.g., television programs, radio programs, Internet media, etc.) by one or more members of the household and/or a corresponding number of time units (e.g., minutes) in which the media was consumed (e.g., watched).

The market researcher may have any number of products/services of interest to evaluate in view of any number of candidate media with which to spend advertising dollars. As described above, a particular product/service of interest may not necessarily have a greater degree of reach by virtue of the popularity of one television program as compared to a second television program. As such, the example program 400 of FIG. 4 identifies, for a selected product/service of interest, a corresponding rating metric (the VRP Rating and/or the VRP Index) for each program (e.g., television program) that the market researcher could target for advertising purposes. Because the VRP Rating and the VRP Index for each program are relative metrics, the market researcher may simply select, for example, the highest relative VRP Rating value when making the decision regarding which program to target with the product/service of interest for advertising purposes.

The example product selector 216 identifies a product of interest to evaluate in view of any number of candidate media (e.g., television programs) (block 406). The example product/service selector 216 may generate a list of products/services that have been purchased by parsing the acquired purchase data from the plurality of households, as described above in connection with block 402. In some examples, the product/service selector 216 includes a web server and/or graphical user interface (GUI) to accept inputs from a user, such as a selected product/service from the parsed list. For each household that has purchased the selected product/service at least once, the example program ranking engine 202 calculates a corresponding Volumetric Factor (VF) (block 408), as described below in connection with FIG. 5.

While the VF reflects a metric indicative of a volume in relation to a total household consumption value (e.g., from a category of interest) (see example Equation 2), the example program manager 220 selects candidate media of interest to be evaluated in connection with the selected product/service of interest (block 410). The example program manager 220 may generate a list of candidate media (e.g., television programs) that have been viewed and/or otherwise consumed (exposure), as revealed in the acquired exposure data from the plurality of households, as described above in connection with block 404. In some examples, the program manager 220 includes a web server and/or GUI to accept an input from a user regarding which one of the candidate media to evaluate. For each selected candidate media of interest, the example rating engine 222 calculates a VRP rating value for each household (block 412), as described in further detail below. Because the market researcher may have any number of additional candidate media to consider when allocating advertising revenue for the product/service of interest (block 414), control may return to block 410 in an iterative manner to calculate a corresponding VRP rating in view of the alternate/additional media. Additionally, because the market researcher may have any number of products/services for which advertising resources are to be applied (block 416), control may return to block 406 to select additional/alternate products/services to evaluate. For each product/service of interest, the example rating engine 222 generates a relative program ranking metric (i.e., VRP rating) associated with each program (e.g., television program), in which the VRP rating for each program is based on the sum of VFs from each household (block 418).

FIG. 5 illustrates an example implementation of calculating the VF (block 408) of FIG. 4. In the illustrated example of FIG. 5, the household segregator 218 selects a household from the list of households in which the selected product/service of interest was purchased at least once (block 502). The example index engine 212 calculates a mathematical product of an amount of that product/service that was purchased and a household weight value (block 504) in a manner consistent with example Equation 2. In the event that one or more members of the household participated in one or more additional purchase instances of the product/service of interest (block 506), then control returns to block 504 to update the calculation. After all purchase instances of the product/service of interest have been accounted for (block 506), the example volumetric engine 212 calculates the sum of the instances (block 508) and values 326 and 372 from FIGS. 3A and 3B, respectively. In the event that there are additional households in the list that have purchase instances of the product/service of interest (block 512), then control returns to block 502 to repeat the calculation in view of the additional household.

FIG. 6 illustrates an example implementation of calculating the VRP rating (block 412) of FIG. 4. As described above, the VRP rating is a relative metric that may be used to identify which one of several candidate media has the greatest potential volume in relation to a total household consumption value. In the illustrated example of FIG. 6, the household segregator 218 selects the same subset of households that were previously identified as having at least one purchase instance of the product/service of interest (block 602). The example exposure time manager 214 creates a subset of households that have any amount of exposure time associated with the current media of interest (e.g., a current television program being evaluated in connection with the product/service of interest) (block 604). From the list of households that have both (a) at least one purchase instance of the product/service of interest and (b) at least some exposure time associated with the current program (e.g., television program) of interest, the example exposure time manager 214 selects one of the households for further evaluation (block 606).

The example rating engine 222 calculates a mathematical product of the previously calculated VF of the currently selected household and a corresponding exposure time (block 608) as shown in the VRP numerator column 320 and 370 of FIGS. 3A and 3B, respectively. A sum of each household VF and corresponding exposure time is calculated and summed (see sum 330 and 376 of FIGS. 3A and 3B, respectively). The example rating engine 222 divides the sum (see sum 330 and/or 376) by a sum of all household VFs and corresponding program duration to yield the household VRP rating using example Equation 3 (block 612). In the event there are additional households in the list that have not yet been evaluated to calculate a VRP rating (block 614), control returns to block 606 to select the next household.

Figure 7:
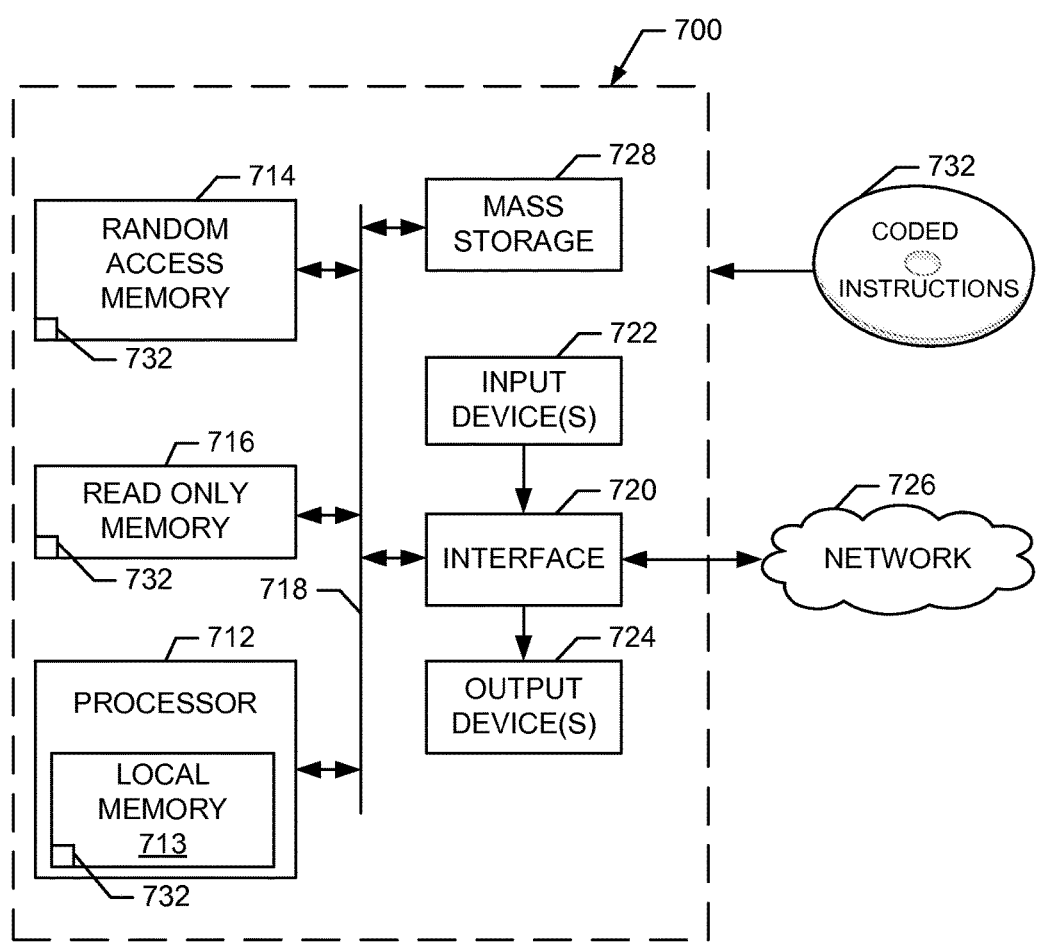
FIG. 7 is a schematic illustration of an example processor platform that may execute the instructions of FIGS. 4-6 to implement the example program ranking engine of FIG. 2.

FIG. 7 is a block diagram of an example processor platform 700 capable of executing the instructions of FIGS. 4-6 to implement the program ranking engine 202 of FIG. 2. The processor platform 700 can be, for example, a server, a personal computer, a mobile device (e.g., a cell phone, a smart phone, a tablet such as an iPad™), or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, a microphone, a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 4-6 may be stored in the mass storage device 728, in the volatile memory 714, in the non-volatile memory 716, and/or on a removable tangible computer readable storage medium such as a CD or DVD.

From the foregoing, it will be appreciated that example methods, systems, apparatus and/or articles of manufacture to facilitate creation of a metric that allows candidate forms of media to be compared to one another in light of a particular product and/or service that is to be promoted have been disclosed. Examples disclosed herein are not limited to predetermined segments (e.g., demographic segments) that are selected based on the discretion of a market analyst, but rather include actual viewing behaviors and purchasing behaviors from all candidate consumers. In the prior art, systems to identify programs that might yield the best marketing opportunities were wasteful of cultivated data by excluding portions of an audience. Additionally, because the prior art systems wasted one or more portions of cultivated data when attempting to identify market opportunities, such systems lacked calculation efficiency. For example, the prior art systems may have selected a first demographic segment of interest to analyze, which results in one or more other demographic segments of interest unrepresented in the analysis. As such, if one or more subsequent analysis attempts were conducted for the one or more other demographic segments of interest, additional computational resources were required to attempt capturing and/or identifying as many marketing opportunities as possible. Accordingly, examples disclosed herein reduce cultivated data waste and improve computational efficiency of market analysis system(s).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computer-implemented method to reduce a media selection error for a product of interest, comprising:
   (a) identifying, by executing an instruction with a processor, households from a measurement sample for which the product of interest was purchased, the measurement sample retrieved from a panelist consumption database via a network;
   (b) reducing the media selection error by executing an instruction with the processor to calculate first consumption factors for corresponding ones of the households based on a first consumption total of the product of interest for the corresponding ones of the households for which the product of interest was purchased and corresponding household weights, the first consumption factors not restricted by targeted demographics;
   (c) selecting, by executing an instruction with the processor, first media;
   (d) calculating, by executing an instruction with the processor, a first rating value indicative of a relevance of the product of interest to the first media based on a ratio of (1) a mathematical product of the first consumption factors for the corresponding ones of the households and viewing minutes of the first media for the corresponding ones of the households and (2) a mathematical product of second consumption factors of the measurement sample and total viewing minutes of the first media by all households of the measurement sample, the second consumption factors indicative of a second consumption total of the product of interest for all households of the measurement sample;

(e) repeating, by executing an instruction with the processor, (c) and (d) for second media, the second media associated with a second rating value;

(f) causing a selection of the first media or the second media without erroneous discretion, by executing an instruction with the processor, based on ranking the first and second rating values of the first and second media for the product of interest; and (g) generating, by executing an instruction with the processor, an overall rating index associated with the first media based on a sum total of respective first and second rating values from the corresponding ones of the households, the overall rating index to facilitate a relative rank of the first media with the second media.

2. The method as defined in claim 1, further including accumulating a sum of purchasing instances for the product of interest during an evaluation period.

3. The method as defined in claim 1, wherein the second consumption factors include the second consumption total based on a dollar amount purchased of the product of interest.

4. The method as defined in claim 3, wherein the second consumption total includes a dollar purchasing value.

5. The method as defined in claim 1, wherein the first consumption factors include the first consumption total based on a number of trips made by a panelist of a corresponding household for the product of interest.

6. The method as defined in claim 1, wherein the first consumption factors include the first consumption total based on a number of units purchased by a panelist of a corresponding household for the product of interest.

7. An apparatus to reduce a media selection error for a product of interest, comprising:
a product data manager to identify households from a measurement sample for which the product of interest was purchased, the measurement sample retrieved from a panelist consumption database via a network;
a volumetric engine to reduce the media selection error by calculating first consumption factors for corresponding ones of the households based on a first consumption total of the product of interest for the corresponding ones of the households for which the product of interest was purchased and corresponding household weights, the first consumption factors not restricted by targeted demographics;
an exposure data manager to select first media; and
a rating engine to:
calculate a first rating value indicative of a relevance of the product of interest to the first media based on a ratio of (a) a mathematical product of the first consumption factors for the corresponding ones of the households and viewing minutes of the first media for the corresponding ones of the households and (b) a mathematical product of second consumption factors of the measurement sample and total viewing minutes of the first media by all households of the measurement sample, the second consumption factors indicative of a second consumption total of the product of interest for all households of the measurement sample;
cause a selection of the first media or second media without erroneous discretion by repeating the selecting and calculating for the second media to facilitate ranking of the first and the second media for the product of interest; and
generate an overall rating index associated with the first media based on a sum total of respective first and second rating values from the corresponding ones of the households, the overall rating index to facilitate a relative rank of the first media with the second media.

8. The apparatus as defined in claim 7, wherein the product data manager is to accumulate a sum of purchasing instances for the product of interest during an evaluation period.

9. The apparatus as defined in claim 7, wherein the product data manager is to identify the second consumption total based on a dollar amount purchased of the product of interest.

10. The apparatus as defined in claim 9, wherein the product data manager is to identify a dollar purchasing value.

11. The apparatus as defined in claim 7, wherein the product data manager is to identify the first consumption total based on a number of trips made by a panelist of a corresponding household for the product of interest.

12. The apparatus as defined in claim 7, wherein the product data manager is to identify the first consumption total based on a number of units purchased by a panelist of a corresponding household for the product of interest.

13. A non-transitory machine readable storage medium comprising machine accessible instructions that, when executed, cause a machine to, at least:
(a) identify households from a measurement sample for which a product of interest was purchased, the measurement sample retrieved from a panelist consumption database via a network;
(b) reduce a media selection error by calculating first consumption factors for corresponding ones of the households based on a first consumption total of the product of interest for the corresponding ones of the households for which the product of interest was purchased and corresponding household weights, the first consumption factors not restricted by targeted demographics;
(c) select first media;
(d) calculate a first rating value indicative of a relevance of the product of interest to the first media based on a ratio of (1) a mathematical product of the first consumption factors for the corresponding ones of the households and viewing minutes of the first media for the corresponding ones of the households and (2) a mathematical product of second consumption factors of the measurement sample and total viewing minutes of the first media by all households of the measurement sample, the second consumption factors indicative of a second consumption total of the product of interest for all households of the measurement sample;
(e) repeat (c) and (d) for second media, the second media associated with a respective second rating value;
(f) cause a selection of the first media or the second media without erroneous discretion based on a rank of the first and second rating values of the first and second media for the product of interest; and (g) generate an overall rating index associated with the first media based on a sum total of respective first and second rating values from the corresponding ones of the households, the overall rating index to facilitate a relative rank of the first media with the second media.

14. The machine readable storage medium as defined in claim 13, wherein the machine readable instructions, when executed, cause the machine to accumulate a sum of purchasing instances for the product of interest during an evaluation period.

15. The machine readable storage medium as defined in claim 13, wherein the machine readable instructions, when executed, cause the machine to identify the second consumption total based on a dollar amount purchased of the product of interest.

16. The machine readable storage medium as defined in claim 13, wherein the machine readable instructions, when executed, cause the machine to identify the first consumption total based on a number of trips made by a panelist of a corresponding household for the product of interest.

17. The machine readable storage medium as defined in claim 13, wherein the machine readable instructions, when executed, cause the machine to identify the first consumption total based on a number of units purchased by a panelist of a corresponding household for the product of interest.

* * * * *